Figure 5:
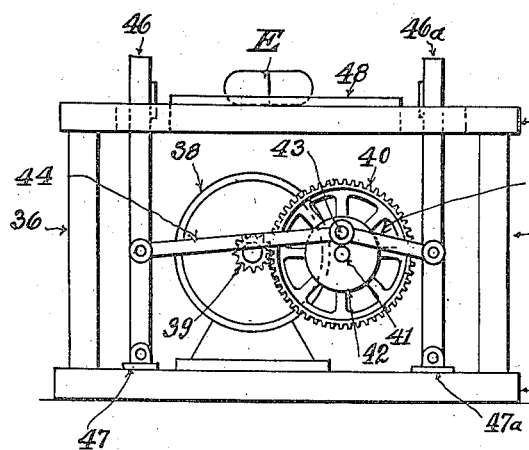

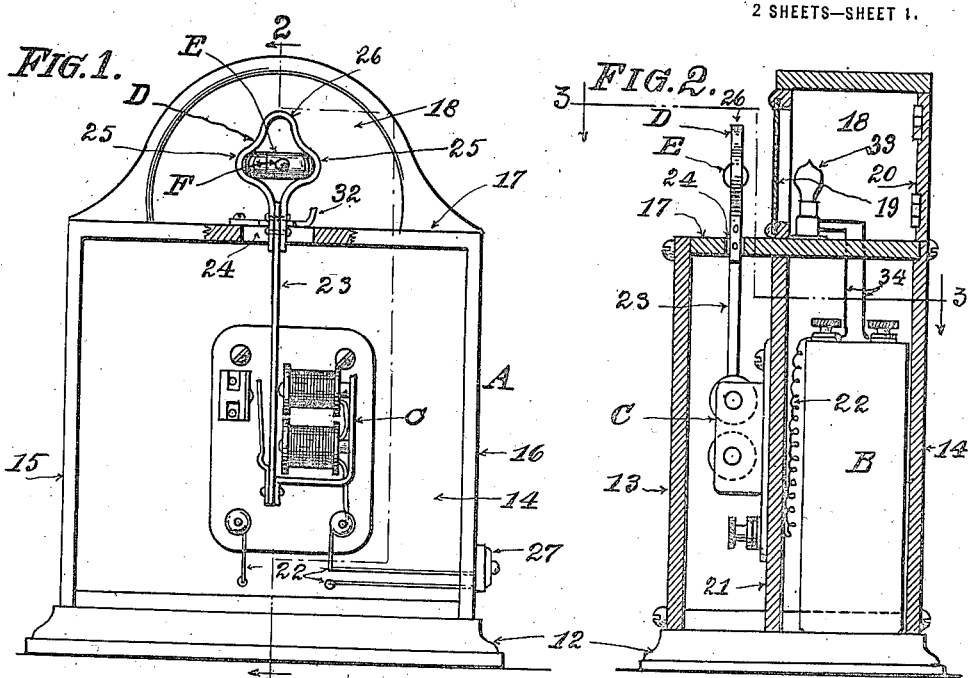
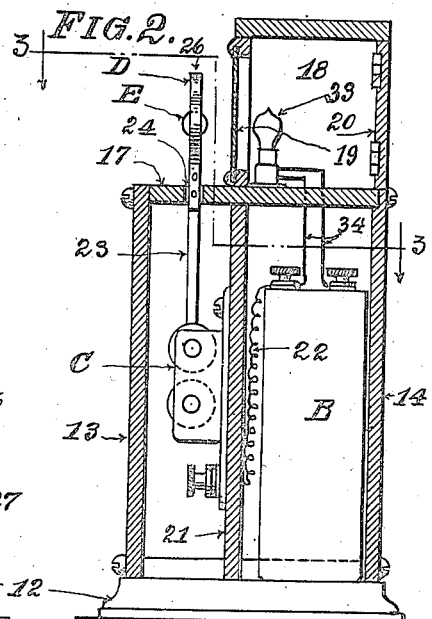
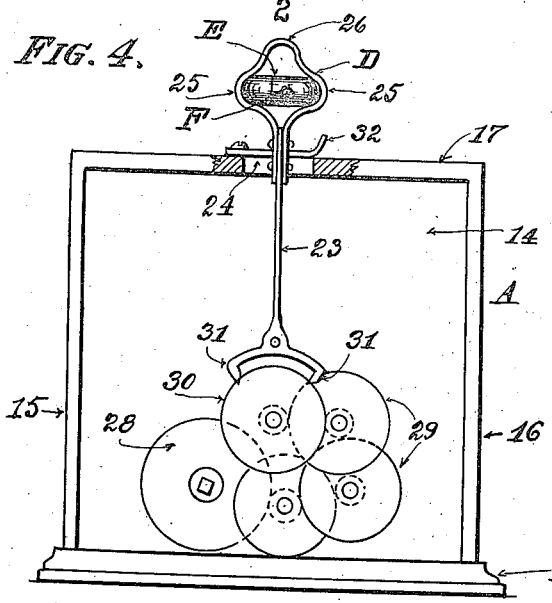
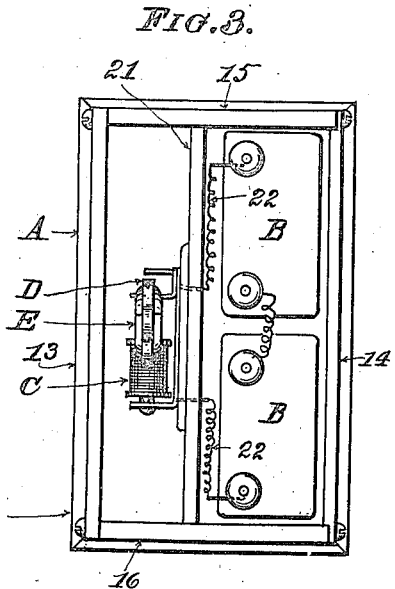

W. M. MUCHOW.
METHOD OF PREPARING AMALGAM FOR DENTISTS' USE.
APPLICATION FILED MAR. 22, 1918.

1,317,886.

Patented Oct. 7, 1919.
2 SHEETS—SHEET 2.

WITNESSES:

INVENTOR:
WM. M. MUCHOW,
BY
ATTORNEYS.

UNITED STATES PATENT OFFICE.

WILLIAM MARK MUCHOW, OF EVANSTON, ILLINOIS.

METHOD OF PREPARING AMALGAM FOR DENTISTS' USE.

1,317,886.          Specification of Letters Patent.          Patented Oct. 7, 1919.

Application filed March 22, 1918. Serial No. 224,089.

*To all whom it may concern:*

Be it known that I, WILLIAM MARK MUCHOW, a citizen of the United States, and a resident of the city of Evanston, in the county of Cook and State of Illinois, have invented certain new and useful Improvements in Methods of Preparing Amalgam for Dentists' Use; and I do hereby declare that the following description of my said invention, taken in connection with the accompanying sheet of drawing, forms a full, clear, and exact specification, which will enable others skilled in the art to which it appertains to make and use the same.

My invention relates generally to improvements in methods of preparing amalgam for dentists' use; and it consists, essentially, in the novel and peculiar combination of parts and details of construction, as hereinafter first fully set forth and described and then pointed out in the claims.

The object of this invention is the inauguration of means for preparing amalgam for use by dentists in filling cavities in human teeth, and the novel and peculiar method of accomplishing this result.

It is desirable and necessary that the amalgam used by the dentists be prepared shortly before being used, owing to the fact that the amalgam hardens very rapidly. Dentists are now generally mixing the metals for the production of the amalgam by kneading the same in the palm of the hand, an operation which is higly objectionable, unsanitary, poisonous, and troublesome.

In order to overcome these objectionable features, I proceed to produce this amalgam by placing the proper alloy and the required mercury into a vessel or container, preferably closed, and then rapidly and violently shake this vessel, whereby the amalgam is readily formed. While it is possible to produce the amalgam, as stated, I prefer to do the mixing and agitating of the composition mechanically; and in the drawings forming a part of this specification, I illustrate several mechanical devices by which the preparation of the amalgam is automatically performed, whereby the time heretofore consumed by the dentist in preparing the amalgam may be otherwise employed, and the patient's occupation of a dentist's chair materially reduced.

Figure 6:
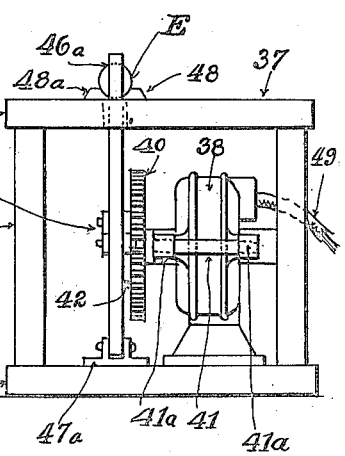
Figure 7:
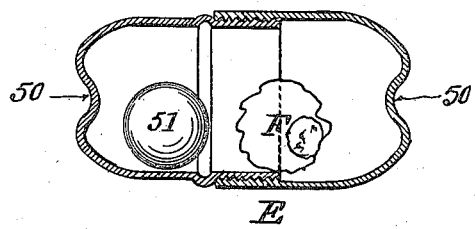

In the drawings, Figure 1 is an elevation of an apparatus embodying my invention, the front of the casing in which the operating mechanism is located, being omitted. Fig. 2 is a transverse sectional elevation on line 2—2 of Fig. 1. Fig. 3 is a plan of the apparatus below the indirect line 3—3 of Fig. 2. Fig. 4 is an elevation of an apparatus showing, diagrammatically, spring-actuated means for rapidly preparing the amalgam. Fig. 5 is an elevation of an apparatus in which the container for the metals is rapidly and violently reciprocated by means similar to the operation of a shuttle in a loom. Fig. 6 is an end elevation of the same. Fig. 7 is a longitudinal sectional elevation on a magnified scale, of a container and the matter contained therein.

Like parts are designated by the same characters and symbols of reference in all the figures.

A, in the drawings designates a casing of any desired design, construction, or configuration, the one shown in Figs. 1, 2 and 3, being conventionally illustrative rather than specifically demonstrative of my invention. This casing, as illustrated, comprises a base 12, side walls 13, 14, end walls 15, 16, and a top 17. Upon this top there is, preferably, formed a cupboard 18, having in front a translucent window 19, and in the rear, preferably, a hinged door 20, whereby access may be had to the interior of the cupboard to place therein containers, the ingredients from which the amalgam is prepared, and other matter, if desired. In this casing A there is, preferably, a partition 21, to divide the casing into two compartments, there being in the rear compartment ample space for electric storage batteries B, while in the front compartment there is located an electric motor C, connected to the source of electric energy by wires 22, in the usual manner. The armature of this electric motor B has a vibrator or pendulum 23, which passes through an aperture 24, in the top 17; and which carries at its upper terminal a clamp or holder D, of approved design, the one shown being of approximately trefoil or cloverleaf contour, said holder being, preferably, resilient, and may be made from a strip of celluloid or other elastic material, so as to retain between opposing members 25, by frictional contact, a container E, which is, preferably, a capsule made from either gelatin, celluloid, or other suitable material or metal which is not affected by mercury. Into this capsule or container the alloy, or the metals forming the alloy, and the proper amount of mercury are placed, the capsule closed, and then placed into the clamp or holder D, by depressing the third member 26, of the trefoil, which causes the opposing members 25 thereof, to spread to admit the container between them. There is a switch or push-button 27, in the wiring 22, wherewith to establish or break connection between the batteries B and the motor C. When the circuit is closed, the motor will rapidly and rather violently reciprocate the pendulum 23, and with it, the capsule E, thereby causing the metals F, in the container to be violently thrown against the ends of the capsule, and thereby the amalgamation of the metals quickly effected in a more thorough manner than has heretofore been attained.

I do not wish to confine myself to the employment of the electric motor described, which is of the well-known electric bell-ringing type, being aware that a number of mechanical devices may be constructed to reciprocate the capsule in the manner described; and in Fig. 4 I have, diagrammatically, depicted a motor of the spiral spring type, said motor including a spring barrel 28, a suitable train of gearing 29, the required escapement wheel 30, and the pallets 31, which actuate the pendulum 23 by the rotation of said escapement wheel; a stop 32, preferably of the alarm-clock type being provided, whereby the vibratory movement of the pendulum may be arrested when the apparatus is not in use.

In Figs. 5 and 6, I have illustrated a further modification of my invention. In this instance I violently throw the capsule containing the matter to be amalgamated in a manner analogous to the operation of a shuttle in a loom. This apparatus comprises, preferably, a base 35, uprights 36, and a table top 37. Upon the base 35 there is mounted an electric motor 38, having on its shaft a gear pinion 39, meshing with a spur gear wheel 40 mounted on a shaft 41, rotatably mounted in bearings 41ª, preferably projecting from the motor 38. In front of this gear wheel 40 there is a crank disk 42, having a wrist pin 43, wherewith engage two connecting rods 44, 44ª, the terminals of which connect to two vertically disposed bars 46, 46ª, pivoted at their lower ends in bearings 47, 47ª, located upon the base 35. These bars project above the table top 37 for some distance. Upon the table top there are placed guides 48, 48ª, between which the capsule E is placed containing the matter to be amalgamated. The motor 38 is connected to a source of electrical energy (not shown) by the usual wiring 49, and when energized will rotate the gearing and connected parts to rapidly reciprocate the bars 46, 46ª.

The capsule E is thereby violently thrown by one bar toward the other bar, and by the latter, returned to the first bar, the effect of which is to cause the matter in the capsule to violently strike the ends of the moving capsule and by the impact with the bar to squash the forming amalgam ball while the capsule is moving, and which is repeated many times before the amalgam is formed ready for use. I find that this alternate rolling and squashing of the ball is the essence of the process of forming the amalgam and to produce perfect results. In order to assist in this squashing of the forming ball, I form the heads of the capsule E with inwardly projecting portions 50, as illutrated in Fig. 7; and if desired, the impact of the mass in the container may be increased by placing into the container, together with the metals, one or more balls 51, made of any material that is not affected by mercury, such as steel or glass.

A capsule made from gelatin will in most cases be strong enough to withstand the impact, but if found necessary, the same may be made of steel, and the two parts of which the capsule is constructed may be connected by a screw-threaded engagement, as clearly indicated in Fig. 7.

While I have described the frame-work of the apparatus illustrated in Figs. 5 and 6, as comprising the parts mentioned, I may here state that the cabinet or casing shown in Figs. 1, 2, and 3, is well adapted to receive the projecting mechanism depicted in Figs. 5 and 6, without change or modification.

And finally, since it is difficult to see the capsule when rapidly moving, I place into the cupboard 18, behind the translucent (preferably ground glass) window an electric incandescent lamp 33, and properly connect the same with the source of electric energy by suitable wiring 34.

I have hereinbefore described with considerable minuteness the preferred embodiment of my invention and several modifications thereof, but I desire it to be distinctly understood that I am aware that many changes may be made therein, and parts omitted without departing from the scope of my invention as defined in the subjoined claims.

Having thus fully described this invention, I claim as new, and desire to secure to myself by Letters Patent of the United States—

1. The method of preparing amalgam for dentists' use, which consists in rolling the metals to be amalgamated into a ball and then violently projecting the mass against an object to impact therewith by the force of inertia of the mass to squash the same, then reforming the ball and again projecting the same, and in continuing this operation to the completion of the amalgamation.

2. The method of preparing amalgam for dentists' use, which consists in placing the metals to be amalgamated into a closed vessel, and then rapidly shaking the vessel to cause the amalgamation of the mass in said vessel by the force of inertia in the mass impacting with the ends of said vessel.

3. The method of preparing amalgam for dentists' use, which consists in placing the metals to be amalgamated into a vessel, then adding to the mass a non-amalgamable, approximately ball-shaped article, then closing the vessel, then rapidly shaking the vessel to cause the amalgamation by the rolling movement of the mass in the vessel and by the impacting of said mass with the ends of said vessel, said ball-shaped article being added to increase the impacting effect of said mass, as described.

4. The method of preparing amalgam for dentists' use, which consists in placing into a receptacle an alloy and mercury, and then agitating the receptacle by a reciprocatory movement thereof, to cause the metals in said receptacle to be violently thrown against the ends of said receptacle by the force of inertia of the mass impacting with the ends of said receptacle.

In testimony that I claim the foregoing as my invention I have hereunto set my hand.

WILLIAM MARK MUCHOW.